No. 854,631. PATENTED MAY 21, 1907.
W. H. CRAGHEAD.
ICE CUTTING MACHINE.
APPLICATION FILED MAY 15, 1906.
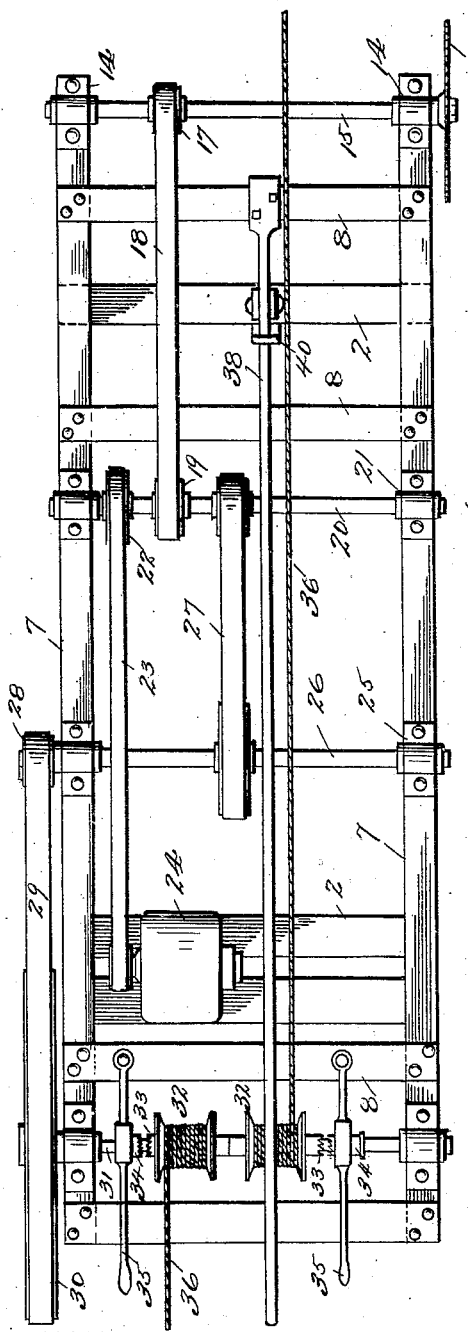
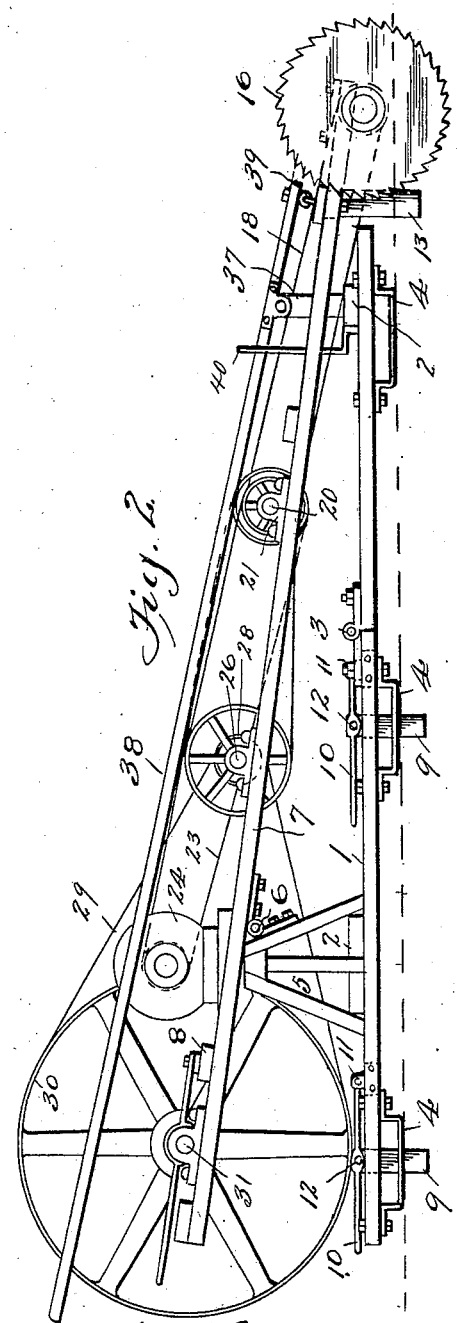
Witnesses
Chas. K. Davies
M. E. Moore
Wm. H. Craghead
Inventor
by Wm. J. Moore
Attorney

UNITED STATES PATENT OFFICE.

WILLIAM H. CRAGHEAD, OF BRIGHAM, UTAH.

ICE-CUTTING MACHINE.

No. 854,631.    Specification of Letters Patent.    Patented May 21, 1907.

Application filed May 15, 1906. Serial No. 316,999.

*To all whom it may concern:*

Be it known that I, WILLIAM H. CRAGHEAD, a citizen of the United States, residing at Brigham, in the county of Boxelder and State of Utah, have invented certain new and useful Improvements in Ice-Cutting Machines, of which the following is a specification.

My invention relates to improvements in ice cutting machines, and has for its object, the provision of a machine for this purpose which will be light and durable in construction, which may be readily transported from place to place and which will be entirely practical in every respect.

Another object of my invention, is to provide a machine which will operate with little or no vibration so that the ice may be cut deeper without danger of breaking the ice through the vibration of the machine.

With these and other objects in view, my invention consists of a frame provided with runners and adapted to be anchored on the ice, a saw frame pivotally connected with the runner frame, a circular saw mounted in the saw frame, a windlass mounted in the saw frame, means for driving the saw and windlass, and means for shifting the position of the saw frame.

My invention further consists of an ice cutting machine embodying certain other novel features of construction, combination and arrangement of parts substantially as disclosed herein.

Figure 1, is a top plan view of my complete ice cutting machine. Fig. 2, is a side elevation thereof in operative position.

In the drawings: The numeral 1, designates the longitudinal side members of the runner or main frame of the machine, which are connected together by the properly-spaced cross-braces 2. The side pieces are composed each of two parts, which are connected by means of a hinge 3, so that the runner frame may accommodate itself to irregularities in the surface of the ice. Brackets 4, are secured upon the lower face of the side members and are formed with rounded edges to provide runners or skates for the frame. Near the rear end of the runner frame is mounted a trestlework or standard 5, and resting upon said trestle and pivoted thereto by means of the hinges 6, is a saw frame composed of the longitudinal side pieces 7, and cross braces 8. Knives or blades 9, pass through slots in the runner frame adjacent the runners, and engage channels or grooves previously formed in the ice for that purpose. Levers or links 10, are hinged at 11, upon the upper face of the runner frame, and are pivotally connected with the blades at 12, so that the blades may be raised when desired. A similar plate or blade 13, is secured at the forward end of the saw frame, and the series of blades forms a means for guiding or anchoring the runner frame in position upon the ice.

Mounted in journal bearings 14, at the forward end of the saw frame, is a shaft 15, mounted upon the outer end of which is a circular saw 16. This shaft is connected by pulley 17, and belt 18, to the pulley 19, on the counter shaft 20, which is properly supported in bearings 21. A driven pulley 22, on the counter shaft 20, is connected by belt 23, to the pulley on the motor 24. This motor constitutes the power for the machine, and may be electric as shown, or a gas or steam engine may be employed, but where practical I prefer to employ an electric motor because of the absence of vibration. Mounted in journal bearings 25, in the rear of the counter shaft is a speed-reducing shaft 26, which is driven by pulley and belt connections 27 from the counter shaft. Carried on the outer extended end of the speed-reducing shaft, is a pulley 28, which is connected by a belt 29, to the large pulley 30, on the end of the windlass-shaft 31. Loosely mounted on the windlass-shaft, are the pair of drums 32, provided each on their outer ends with ratchet teeth 33, and adjacent the ends of the drums, are mounted the sleeves 34, formed with ratchet teeth to engage the teeth on the drums. These sleeves are slidably engaged on the shaft and are shifted by means of the levers 35, and constitute clutch members to throw either of the drums into operation. Cables 36, are carried by the drums, one of them passing over and the other passing under the respective drums, so that by throwing the proper windlass into engagement, the machine may be drawn either backward or forward.

An upright post 37, is carried on the forward end of the runner frame, and pivoted to the post is a lever 38, which extends rearward to the end of the runner frame. The forward end of the lever is connected by link 39, to the saw frame, and lateral play of the lever is prevented by means of the guide bar 40.

The operation of the device will be readily understood. Grooves are first cut in the ice by means of a plow or similar apparatus. The free end of the proper cable is then anchored and the windlass thrown into operation and the machine is drawn to the proper position for cutting. The guiding blades are let down into the channels in the ice and the machine is thereby anchored in place. The depth of the cut may be varied by raising or lowering the saw frame by means of the lifting lever, and this lever serves to lift the saw when the machine is shifted from place to place.

From this description taken in connection with the drawings, it will be evident that I have provided an ice cutting machine which accomplishes all the objects herein set forth, and is desirable and practical.

I claim:

1. An ice cutting machine comprising a runner frame, adjustable guiding blades vertically movable in said frame, a tilting saw frame mounted on the runner frame, and a saw, windlass and operating means mounted so as to substantially balance on said saw frame.

2. A runner frame comprising two hinged sections one section being provided with guiding means, a trestle upon one of the sections, a saw frame pivoted upon said trestle, power mechanism, windlasses and saw mounted to balance on the saw frame, and means for raising and lowering the end of the saw frame.

In testimony whereof I affix my signature in presence of two witnesses.

WILLIAM H. CRAGHEAD.

Witnesses:
ALBERT POLSON,
DAVID STOHL.